UNITED STATES PATENT OFFICE.

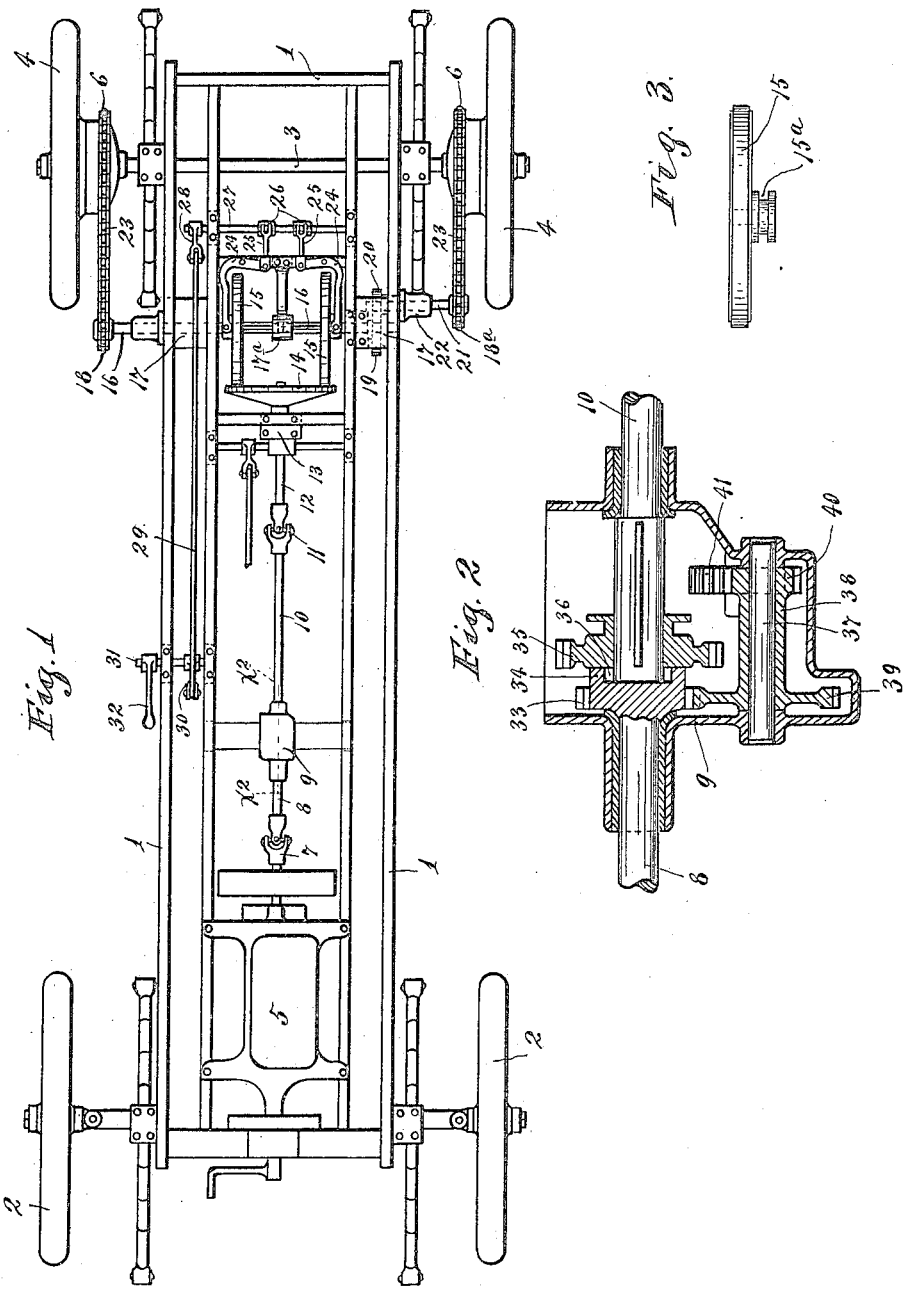

ROWLAND SPARLING, OF MINNEAPOLIS, MINNESOTA, ASSIGNOR TO DISPATCH MOTOR CAR COMPANY, OF MINNEAPOLIS, MINNESOTA, A CORPORATION OF SOUTH DAKOTA.

TRANSMISSION MECHANISM.

1,225,190.      Specification of Letters Patent.      Patented May 8, 1917.

Application filed April 20, 1914. Serial No. 833,100.

*To all whom it may concern:*

Be it known that I, ROWLAND SPARLING, a citizen of the United States, residing at Minneapolis, in the county of Hennepin and State of Minnesota, have invented certain new and useful Improvements in Transmission Mechanism; and I do hereby declare the following to be a full, clear and exact description of the invention, such as will enable others skilled in the art to which it appertains to make and use the same.

My invention has for its object to provide an improved transmission mechanism for automobiles or motor propelled vehicles, wherein a frictional variable speed differential gear mechanism is used in combination with a reversible toothed gear mechanism; and to such ends, generally stated, the invention consists of the novel devices and combinations of devices hereinafter described and defined in the claim.

The invention is illustrated in the accompanying drawings wherein like characters indicate like parts throughout the several views. Referring to the drawings:

Figure 1 is a plan view showing the improved transmission mechanism applied to an automobile;

Fig. 2 is an enlarged vertical section taken approximately on the line $x^2$ $x^2$ on Fig. 1; and Fig. 3 is a plan view showing in detail, one of the laterally adjustable peripheral friction wheels of the variable speed differential gear mechanism.

Of the parts of the chassis of the automobile, it is only desirable to note the framework 1, the front wheels 2, the rear axle 3, rear traction wheels 4 and engine 5. The rear traction wheels 4 are mounted on the rear axle 3 for differential rotary movements, and on their hubs they carry sprockets 6. The engine crank shaft proper, at its rearwardly projected end, is, as shown, connected by a universal joint 7 to an axially alined shaft 8 journaled in a gear casing 9 rigidly secured to the framework 1. The gear casing 9 incloses the coöperating spur gears of a reversible transmission mechanism. The front end of a shaft 10 that is axially alined with the shaft 8, is also journaled in the casing 9, and at its rear end, as shown, is connected by a universal joint 11 to the front end of an axially alined shaft 12 that is journaled in a suitable bearing 13 on the framework 1 and is equipped at its rear end with a face friction wheel 14. The face friction wheel 14 runs in frictional engagement with the peripheries and a pair of peripheral friction wheels 15 that are keyed to rotate with, but mounted to slide upon a divided transverse counter shaft 16 journaled in suitable bearings 17 and 17ª secured on the frame 1. The abutting ends of the shaft section 16 are journaled to the central bearing 17ª, and the outer end of one of the said shaft sections is provided with a sprocket 18, and the projecting end of the other shaft section 16 is provided with a spur gear 19, which latter meshes with a spur gear 20 secured on the inner end of a supplemental counter shaft 21 shown as journaled in a bearing 22 on the adjacent side of the frame 1. The outer end of the supplemental counter shaft 21 is provided with a sprocket 18ª. Sprocket chains 23 run over the sprockets 6 on the hubs of the traction wheels 4, and over the respective alined sprockets 18 and 18ª.

The friction wheels 14—15—15 constitute the variable speed differential gear, and it will, of course, be understood that the gears 19 and 20 and supplemental shaft 21 are provided for the purpose of transmitting motion so that both traction wheels will be driven in the same direction from the reversely rotated friction wheels 15, which friction wheels are located on opposite sides of the axis of the face friction wheel 14 which drives them.

As a simple and efficient means for simultaneously moving the peripheral friction wheels 15 toward each other to decrease the speed, or from each other to increase the speed, I provide bell crank levers 24 that are pivoted on the transverse bar of the frame 1, and the forwardly projecting ends of which have pins that engage grooves 15ª formed in the hubs of the said wheels 15. The inwardly extended arms of the bell cranks 24 are connected by short links 25 to upwardly extended arms 26 secured on a transverse rock shaft 27. This rock shaft 27 is journaled in suitable bearings on the frame 1, and at one end has an arm 28 that is connected by a link 29 to an arm 30 of a short rock shaft 31, which latter is journaled in suitable bearings on the frame 1 and provided with an operating lever 32, that will preferably be located within reach of the driver's seat.

Obviously, a rearward movement of the lever 32 will cause the friction wheels 15 to be moved laterally toward each other to thereby decrease speed and increase power, while forward movement of the said lever 32 will move the friction wheels 15, simultaneously, away from each other, so as to thereby increase speed, with, of course, the resulting decreased power.

Any of the well known, or other suitable toothed gear reversing mechanism may be employed as a reversing device for this improved transmission mechanism, inasmuch as the broad idea of the invention consists in combining such toothed gear reversing device with a variable speed frictional differential gear mechanism.

As shown, this reversible toothed gear reversing device comprises as follows:

The numeral 33 indicates a spur gear located within the case 9 and secured to the rear end of the shaft section 8 and provided with a half clutch 34. The numeral 35 indicates a spur gear that is keyed for sliding movements on the front end of the shaft section 10, and is provided with a half clutch 36 that is engageable with the said half clutch 34, so as to thereby directly connect the shaft sections 8 and 10 when desired, or when the machine is to be driven forward. Secured in the lower portion of the casing 9 is a horizontal spindle 37 on which is journaled a sleeve 38 that carries two spur gears 39 and a spur pinion 40. The spur gear 39 is in constant mesh with the gear 33 on the shaft section 8, while the pinion 40 is in constant mesh with a transmission gear 41, shown in part in Fig. 2, and which will be suitably journaled within the casing 9, in a manner easily understood. When the gear 35 is slid so as to carry the half clutches 33 and 36 out of engagement, the shaft section 10 will be disconnected from the constantly running shaft section 8; and when the said gear 35 is moved laterally into mesh with the intermediate gear 41, the shaft section 10 will be driven from the shaft section 8 through the gears 33, 39, 40, 41 and 35, and the said shaft 10 will be then driven backward in a reverse direction and at a relatively low speed as compared with the speed at which it is driven when the said shaft sections 8 and 10 are coupled together.

With the construction described, as is evident, the half clutches 34 and 36 afford a clutch for throwing the transmission mechanism into and out of action at will. However, in actual practice, suitable means, such for instance as that illustrated in the copending application of Robert E. Carswell, Serial Number 831,358, filed of date, April 13, 1914, and entitled "Transmission mechanism for automobiles," would preferably be provided whereby the face friction wheel 14 may be moved into and out of engagement with the peripheral friction wheels 15 at will, so as to thereby afford a friction clutch for throwing the transmission mechanism into and out of action, at will.

What I claim is:

The combination with the motor and traction wheels of a motor-propelled vehicle, of an engine driven shaft, a toothed reversing gear mechanism interposed in said shaft, and a friction gear mechanism having three coöperating friction wheels, one of which is driven from said shaft and the other two of which are connected, one to each of the traction wheels of said vehicle.

In testimony whereof I affix my signature in presence of two witnesses.

ROWLAND SPARLING.

Witnesses:
F. D. MERCHANT,
HARRY D. KILGORE.

Copies of this patent may be obtained for five cents each, by addressing the "Commissioner of Patents, Washington, D. C."